(12) United States Patent
Yonezawa

(10) Patent No.: US 6,657,782 B2
(45) Date of Patent: Dec. 2, 2003

(54) MICROSCOPE EPISCOPIC ILLUMINATION DEVICE AND MICROSCOPE THEREWITH

(75) Inventor: Yasuo Yonezawa, Zushi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/080,620

(22) Filed: Feb. 25, 2002

(65) Prior Publication Data

US 2002/0159143 A1 Oct. 31, 2002

(30) Foreign Application Priority Data

Feb. 26, 2001 (JP) ........................ 2001-050526

(51) Int. Cl.[7] .................... G02B 21/06; G02B 21/00
(52) U.S. Cl. ................ 359/388; 359/363; 359/368; 359/385
(58) Field of Search .................. 359/363, 368–390, 359/201.1–201.2

(56) References Cited

U.S. PATENT DOCUMENTS

| | | | | | |
|---|---|---|---|---|---|
| 2,078,586 A | * | 4/1937 | Richter | .................. | 359/385 |
| 3,799,645 A | * | 3/1974 | Stankewitz | .................. | 359/388 |
| 3,876,289 A | * | 4/1975 | DeVeer et al. | .................. | 359/683 |
| 4,163,150 A | * | 7/1979 | Stankewitz | .................. | 250/205 |
| 4,253,726 A | * | 3/1981 | Taira | .................. | 359/388 |
| 4,643,540 A | * | 2/1987 | Kawasaki et al. | .................. | 359/368 |
| 5,684,625 A | * | 11/1997 | Stankewitz et al. | .................. | 359/385 |
| 5,777,784 A | | 7/1998 | Tanaka | .................. | 359/388 |

* cited by examiner

Primary Examiner—Thong Nguyen

(57) ABSTRACT

In order to provide a microscope episcopic illumination device and a microscope therewith having simple structure, having an aperture diaphragm and a field stop, and being capable of setting optimum light source magnification in accordance with change of an image surface size required for from eyepiece observation to TV observation. The microscope episcopic illumination device has a light source, a collector lens, an aperture diaphragm, a light source image forming lens portion for forming an image of the light source in the vicinity of the aperture diaphragm, pupil relay lens groups for re-forming the image of the light source formed in the vicinity of the aperture diaphragm in the vicinity of a pupil surface of an objective lens, and a field stop. The lens portion is a lens system with a variable finite focal distance, and varies a projection magnification of a ratio of the re-formed image of the light source in the vicinity of the pupil surface to the light source by changing the focal distance thereof.

7 Claims, 5 Drawing Sheets

MICROSCOPE EPISCOPIC ILLUMINATION DEVICE AND MICROSCOPE THEREWITH

This application claims the benefit of Japanese Patent application No. 2001-050526 which is hereby incorporated by reference.

BACKGROUND OF THE INVENTION

1. Field of the Invention

The present invention relates to an episcopic illumination device for a microscope and particularly to an episcopic fluorescent illumination device suitable for fluorescent illumination. The present invention relates to a microscope equipped with the episcopic illumination device.

2. Related Background Art

In general, the Koehler illumination method is utilized for episcopic illumination of a microscope. The Koehler illumination method is the one in which an image of a light source is projected to a pupil surface of an objective lens and the objective lens serves also as the role of a condenser lens to illuminate a specimen.

A light source magnification is an important factor for determining the brightness of illumination and the uniformity of illumination in the Koehler illumination method. Here, the light source magnification means a projection magnification that is the ratio of the size of the light source image formed in the vicinity of the pupil surface of the objective lens to the size of the light source.

In order to increase the brightness of illumination, it is necessary to increase the light source magnification. On the other hand, in order to improve the uniformity of illumination, it is necessary to decrease the light source magnification. Therefore, the brightness of illumination and the uniformity of illumination are in the relationship of trade-off with respect to the light source magnification.

The Koehler illumination method and the light source magnification will be described hereinafter by reference to FIGS. 5A and 5B. FIGS. 5A and 5B are diagrams showing the concept of the Koehler illumination method. FIG. 5A is the diagram showing a light beam illuminating the center of a specimen. FIG. 5B is the diagram showing a light beam illuminating the outermost periphery of the specimen.

First, the structure of the illumination system in FIGS. 5A and 5B will be described.

Light emitted from a light source 1 is projected on a pupil surface 9 of an objective lens 10 via a collector lens 2 (focal distance: f2) and a light source image forming lens 3 (focal distance: f3). At this time, the light source magnification β is β=f3/f2. The projected light illuminates a specimen 11 (the diameter of the illuminated area: Φ11) with the objective lens 10 (focal distance: f10) as a condenser lens.

Next, the relationship between the light source magnification and the brightness of illumination will be described with reference to FIG. 5A.

From FIG. 5A, when the light source 1 is a circular surface light source, the diameter of the image of the light source 1 projected on the pupil surface 9 of the object lens 10 is expressed as the following equation:

$$S9 = \beta \times S1 \quad (1)$$

wherein
S1: the diameter of the light source when the light source is the circular surface light source,
S9: the diameter of the light source image projected on the pupil surface of the objective lens, and
β: the light source magnification.

Therefore, the numerical aperture NA10 of the illumination light illuminating the specimen 11 is expressed as the following equation:

$$NA10 = S9/(2 \times f10) \quad (2)$$
$$= (\beta \times S1)/(2 \times f10)$$

wherein
NA10: the numerical aperture of the illumination light, and
f10: the focal distance of the objective lens 10.

The brightness of illumination is proportional to the square of the numerical aperture NA10. Therefore, from the equation (2), the brightness of the Koehler illumination is proportional to the square of the light source magnification β. Accordingly, in order to increase the brightness of illumination, it is necessary to increase the light source magnification.

Next, the relationship between the light source magnification and the uniformity of illumination will be described with reference to FIG. 5B.

From FIG. 5B, the beam illuminating the periphery of the specimen 11 has an angle θ1 with respect to an optical axis AX when emitted from the light source 1. Here, the relationship between the angle θ1 and the diameter Φ11 of the illuminated area of the specimen 11 is obtained. Assuming that the entire optical system satisfies the sine condition, the numerical aperture on an aperture diaphragm AS is expressed by the following equation:

$$NA9 = \Phi11/(2 \times f10) \quad (4)$$

wherein
NA9: the numerical aperture on the aperture diaphragm AS, and
Φ11: the diameter of the illuminated area of the specimen 11.

The numerical aperture when the beam from the light source 1 is incident on the collector lens 2 is the sine of the angle θ1, and from the equation (4), is expressed by the following equation:

$$SIN\theta1 = NA\ 1 \quad (3)$$
$$= \beta \times NA9$$
$$= (\beta \times \Phi11)/(2 \times f10)$$

wherein
NA1: the numerical aperture when the beam from the light source is incident on the collector lens 2, and
SIN θ1: the sine of the angle formed between the beam from the light source 1 for illuminating the periphery of the specimen 11 at the time of the emission and the optical axis.

From the equation (5), the SIN θ1 of the angle θ1 is proportional to the light source magnification β. In general, the intensity of the light emission from the light source 1 is decreased as the angle θ1 is increased. The decrease of the intensity of the light emission causes limb darkening of the illumination, deteriorating the uniformity of the illumination. Accordingly, in order to improve the uniformity of the illumination while reducing limb darkening, it is necessary to decrease the light source magnification β to reduce the angle θ1.

As above, at the time of designing an illumination system, it is necessary to balance the brightness of illumination with the uniformity of illumination. Therefore, taking into consideration a light source to be used, a pupil diameter of an objective lens and an image surface size, an optimum light source magnification is set.

Due to the spread of high sensitivity cameras in recent years, it has become possible to observe things that could not be watched for the sake of darkness previously. Therefore, the scope of observable objects has been widened. Accordingly, a form of observation has been shifted from that with the aid of naked eyes in close contact to that with the aid of TV camera (TV observation).

Consequently, it is necessary to optimize the light source magnification of an episcopic illumination device not only for an image surface size of an eyepiece portion but also for that of a TV camera. The image surface size of the TV camera is small as compared with that of the eyepiece portion. Therefore, for TV observation, the illumination device is required to increase the brightness of illumination while maintaining the uniformity of illumination. Then, in order to increase the brightness of illumination, it is necessary to increase the light source magnification, as mentioned above.

As a method for optimizing a light source magnification even for an image surface size of a TV camera, there is a known method wherein a zoom variable power optical system is utilized in an illumination optical system to vary the light source magnification successively. As a concrete example of the illumination optical system with the zoom variable power optical system, there is an illumination optical system disclosed in the Japanese Patent Laid-Open Publication No. 2-16517. The illumination optical system is a Koehler illumination system by the use of an afocal zoom variable power optical system. However, in this system, it is necessary to form a collector lens with a telecentric optical system on the side of the light emission. In this case, the whole illumination optical system becomes complicated.

SUMMARY OF THE INVENTION

The present invention is made in view of the above problems, and it is an object of the present invention to provide a microscope episcopic illumination device and a microscope having simple structure, having an aperture diaphragm and a field stop, and being capable of setting an optimum light source magnification in accordance with change of an image surface size required for from eyepiece observation to TV observation.

The above object is achieved by providing a microscope episcopic illumination device having a light source for supplying light, a collector lens system for converting the light from the light source into parallel light flux, an aperture diaphragm, a light source image forming lens system for forming an image of the light source in the vicinity of the aperture diaphragm, a pupil relay lens system for re-forming the image of the light source formed in the vicinity of the aperture diaphragm in the vicinity of a pupil surface of an object lens system, and a field stop provided between the aperture diaphragm and the pupil surface of the object lens system, wherein the light source image forming lens system is a lens system with a variable finite focal distance, and varies a projection magnification of a ratio of the size of the re-formed image of the light source in the vicinity of the pupil surface of the object lens system to the size of the light source by changing the focal distance thereof.

A microscope of the present invention is characterized by having: the microscope episcopic illumination device according to the present invention; at least a camera port for mounting an electronic camera; a light path switching member for switching a light path of light from a specimen in order to direct the light from the specimen either to said camera port or to an eyepiece portion; a drive unit for varying the focal distance of the light source image forming lens system; and a controller for controlling the drive unit, wherein the controller controls the drive unit to set the projection magnification based on the size of an image pick-up surface of the electronic camera mounted on the camera port.

DESCRIPTION OF THE PREFERRED EMBODIMENTS

Figure 1:
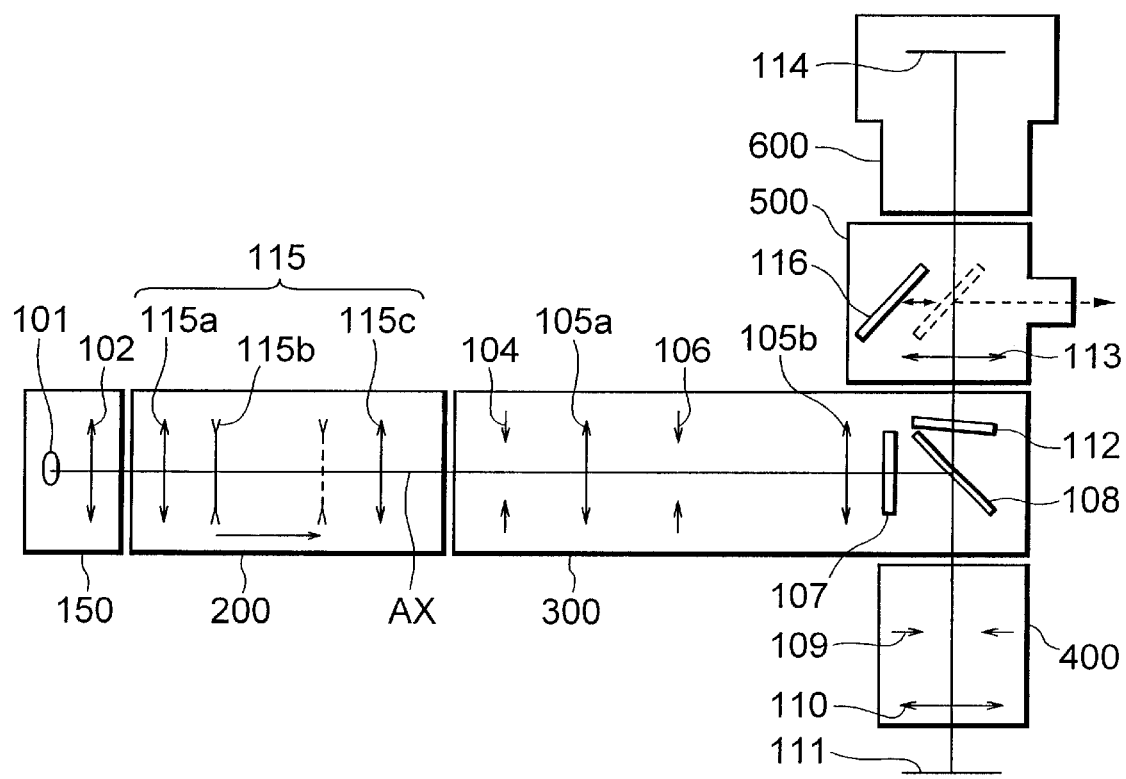
FIG. 1 is a schematic diagram showing a microscope episcopic fluorescent illumination device according to a first embodiment of the present invention.

A microscope episcopic fluorescent illumination device according to a first embodiment will be described with reference to an accompanying drawing. FIG. 1 is a schematic diagram showing the microscope episcopic fluorescent illumination device according to this embodiment.

A light source portion 150 is constituted of a light source 101 (mercury lamp) and a collector lens 102. Light emitted from the light source 101 is made to be substantially parallel light flux by a collector lens 102 (focal distance: f102=25). The substantially parallel light flux from the light source portion 150 is incident on a light source image forming zoom lens portion 200.

A light source image forming zoom lens 115 (focal distance: f115=100~150) in the zoom lens portion 200 is constituted, in order from the side of the light source 101, of a first positive lens group 115*a* (focal distance: f115*a*=95), a second negative lens group 115*b* (focal distance: f115*b*=−40) and a third positive lens group 115*c* (focal distance: f115*c*=95).

The second negative lens group 115*b* is movable along an optical axis AX. Due to the shift of the second negative lens group 115*b*, the focal distance of the light source image forming zoom lens 115 is successively changeable among f115=100~150.

The light source image forming zoom lens 115 forms an image of the light source 101 in the vicinity of an aperture diaphragm 104. The aperture diaphragm 104 and the light source 101 are conjugate.

An episcopic illumination main body 300 is constituted of the aperture diaphragm 104, a front pupil relay lens group 105*a* (focal distance: f105*a*=50), a rear pupil relay lens group 105*b* (focal distance: f105*b*100), a field stop 106, an excitation filter 107, a dichroic mirror 108 and a barrier filter 112.

The image of the light source 101 is formed again in the vicinity of a pupil plane 109 of an objective lens 110 by the front pupil relay lens group 105a and the rear pupil relay lens group 105b. The field stop 106 is disposed between both relay lens groups 105a and 105b in a position conjugate to both a specimen 111 and an image pick-up plane 114.

The light emitted from the rear pupil relay lens group 105b is limited via the excitation filter 107 to light with a required waveband. The limited light is reflected via the dichroic mirror 108 and an image thereof is finally re-formed on the pupil plane 109 of the object lens 110.

A microscope main body 400 has the object lens 110 (focal distance: f110=20). Also, the pupil plane 109 of the objective lens 110 is located in the main body 400.

The image-reformed light is incident on the objective lens 110 and illuminates the specimen 111 (diameter of the illuminated area: $\Phi 111=2.5$) with the lens 110 as a condenser lens).

When illuminated, the specimen 111 emits fluorescence. The fluorescence from the specimen 111 passes the objective lens 110 and is transmitted through the dichroic mirror 108. The fluorescence transmitted through the dichroic mirror 108 is limited to that with a required waveband by the barrier filter 112, and is incident on a lens-barrel portion 500.

The lens-barrel portion 500 is constituted of a second objective lens 113 (focal distance: f113=200) and an observation light-path switching mirror 116. The image of the fluorescence from the specimen 111 is formed on the image pick-up plane 114 ($\Phi 114=25\sim 11$) in a camera 600. The observation light-path switching mirror 116 is removably loadable in the light path. Therefore, when the observation light-path switching mirror 116 is inserted in the light path, the fluorescence from the specimen 111 is directed to an eyepiece observing portion (not shown). Thereby, observation through an eyepiece is enabled.

Table 1 shows distances between the respective elements of the microscope episcopic fluorescent illumination device according to this embodiment. The positions of the lenses are based on those of the principal points thereof.

Numbers in Table 1 indicate the reference numbers given to the elements in FIG. 1. For example, D (101, 102) represents the distance between the light source 101 and the collector lens 102.

TABLE 1

| Element | Distance |
|---|---|
| D (101, 102) | 25 |
| D (102, 115a) | 20 |
| D (115a, 115b) | 7~23.3 |
| D (115b, 115c) | 96.7~80.4 |
| D (115c, 104) | 215 |
| D (104, 105a) | 50 |
| D (105a, 106) | 60 |
| D (106, 105b) | 100 |
| D (105b, 109) | 100 |
| D (109, 110) | 20 |
| D (110, 111) | 20 |
| D (113, 114) | 200 |

Next, a light source magnification in the embodiment will be described. As mentioned above, the focal distance of the light source image forming zoom lens 115 is successively changeable within f115=100~150. Also, the image of light from the light source 101 is formed in the vicinity of the aperture diaphragm 104. Therefore, the image of the light source 101 to be formed at this time is changeable in four to six times the size of the light source 101 successively.

The formed image of the light source 101 is re-formed in the vicinity of the pupil plane 109 of the objective lens 110 by the pupil relay lens groups 105a and 105b. At this time, the size of the re-formed image becomes double the size of the image of the light source 101 due to the focal distances of the pupil relay lens groups 105a and 105b. Thereby, the light source magnification in this embodiment becomes a successively variable value of $\beta=8\sim 12$.

Generally in the prior art, the light source magnification suitable for observation through an eyepiece is $\beta=8$ with the image surface size $\Phi=25$. Also, the light source magnification suitable for TV observation is $\beta=12$ with the image surface size $\Phi=11$. Therefore, in this embodiment, from eyepiece observation to TV observation, it is possible to select the optimum light source magnification in accordance with the change of the image surface size.

As mentioned above, the brightness of illumination and the uniformity of illumination due to the change of the light source magnification have the relationship of trade-off. Accordingly, when the light source magnification is increased by way of zooming while the same visual field is maintained, that is, the image surface size is maintained, the uniformity of illumination is lowered. However, in this embodiment, as the image surface size is made smaller, the light source magnification is increased. Consequently, even though the light source magnification is increased, the visual field for observation is reduced, so that there occurs no problem such as limb darkening, enabling the uniformity of illumination.

Figure 2:
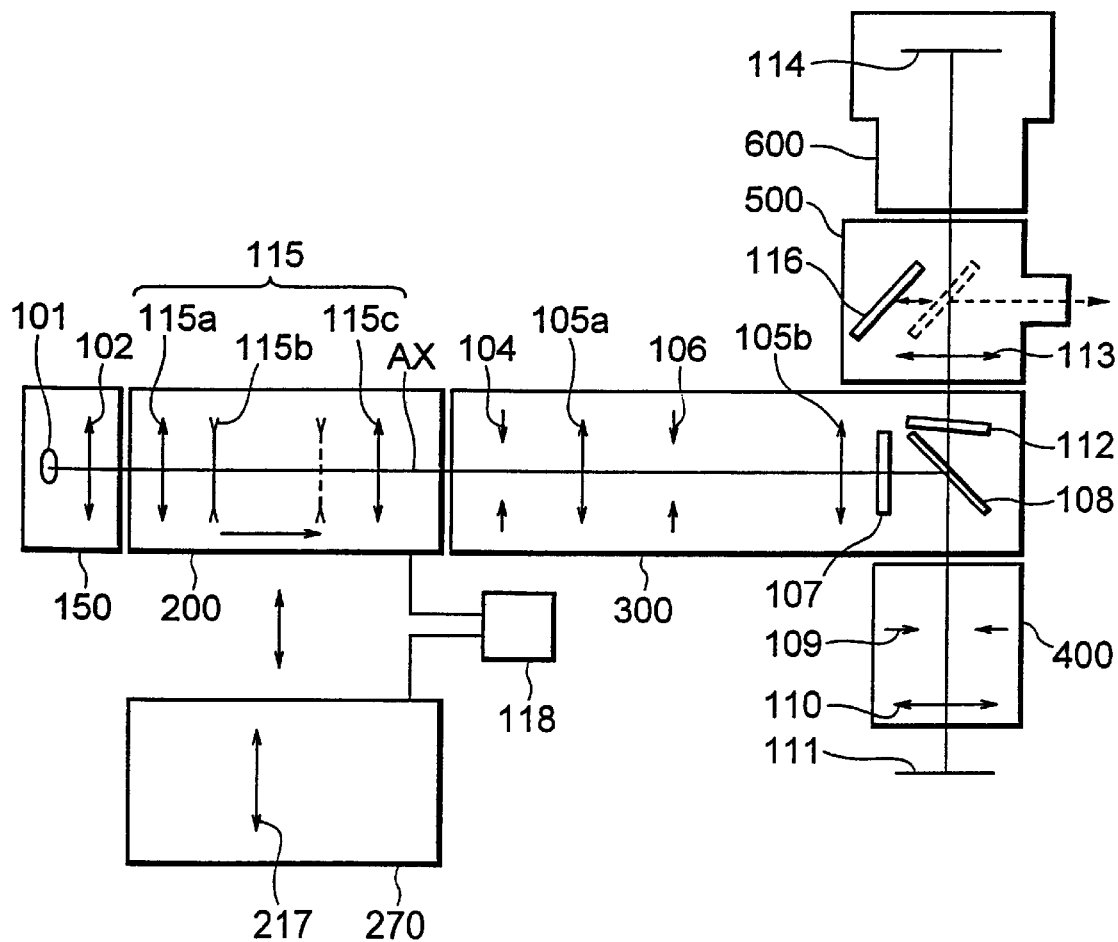
FIG. 2 is a schematic diagram showing a microscope episcopic fluorescent illumination device according to a second embodiment of the present invention.

FIG. 2 is a schematic diagram showing a microscope episcopic fluorescent illumination device for a microscope according to a second embodiment. The same elements as those in the first embodiment are given the same reference numbers, and the description thereof is omitted, and the characteristic part will be described in detail.

In the illumination device according to this embodiment, the light source image forming zoom lens portion 200 of the microscope episcopic fluorescent illumination device of the microscope in the first embodiment is made interchangeable (loading and unloading) for a light source image forming lens unit 270.

The light source image forming lens unit 270 is constituted of a light source image forming lens 217 with a focal distance (fixed) different from that of the light source image forming zoom lens portion 200. The interchange between the lens unit 270 and the light source image forming zoom lens portion 200 is carried out by a shifting mechanism 118. Due to this structure, the light source image forming zoom lens portion 200 and the light source image forming lens unit 270 are selectively loadable in the light path. Due to this structure, the optimum light source magnification is obtained effectively.

In this embodiment, the light source image forming lens unit 270 and the light source image forming zoom lens portion 200 are utilized. However, a plurality of light source image forming lens units with different focal distances may be utilized. In which case, it is possible to observe by selecting a light source image forming lens unit with a desired focal distance properly.

Also, in this embodiment, an observer may manually carry out the interchange of the light source image forming lens unit 270 and the light source image forming zoom lens portion 200. In this case, as required, the observer is to mount a desired light source image forming zoom lens portion or light source image forming lens unit separately prepared. In case that zoom variable power is unnecessary due to the above structure, it is possible to lower cost.

Figure 3:
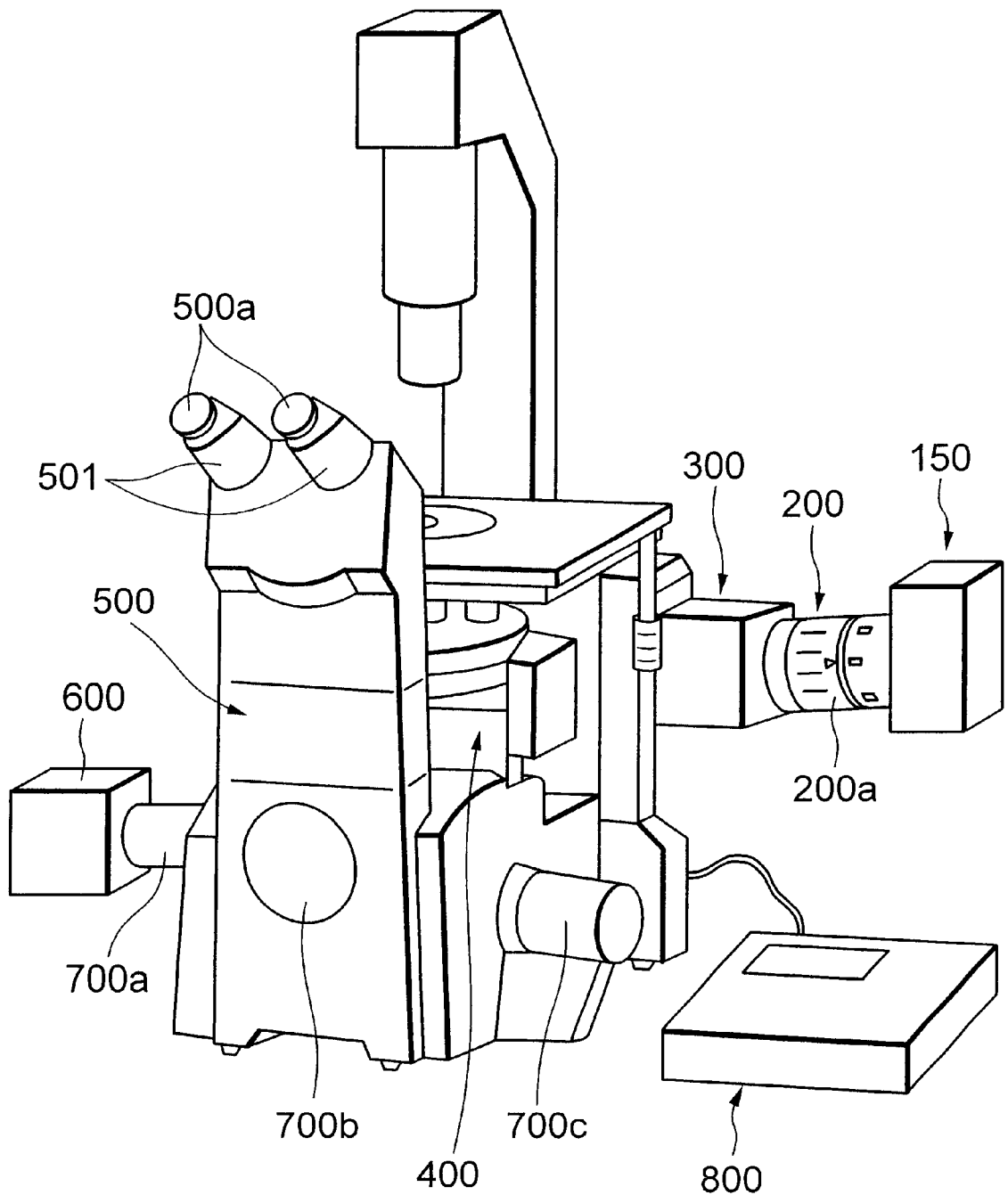
FIG. 3 is a perspective view showing an inverted microscope according to a third embodiment of the present invention.
Figure 4:
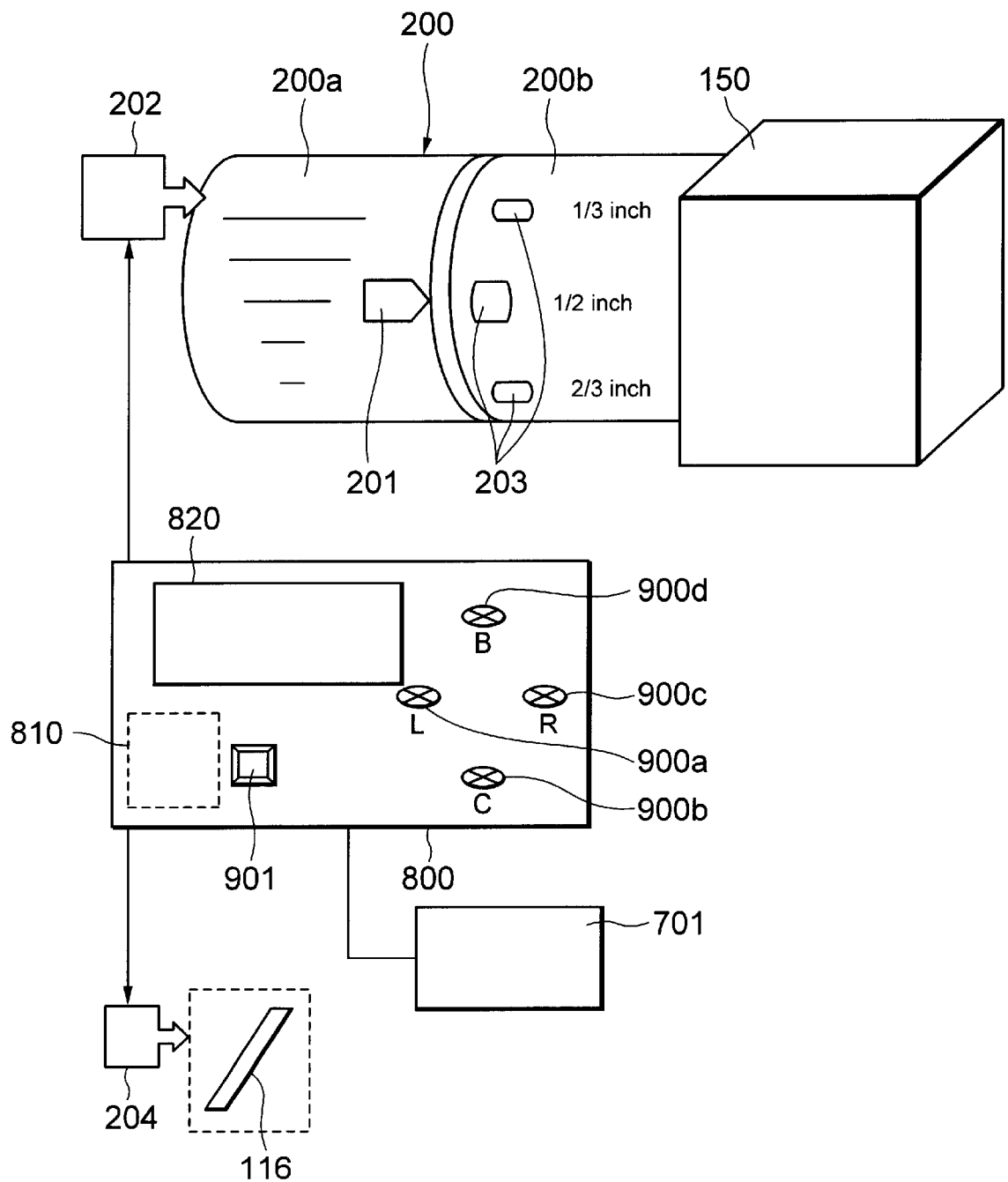
FIG. 4 is a diagram showing the automated light source image forming zoom lens portion.
Figure 5A:
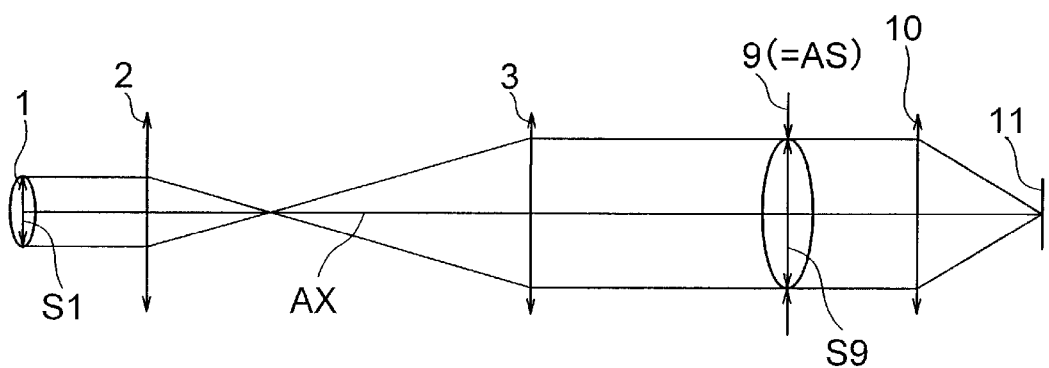
FIGS. 5A and 5B are diagrams showing the concept of the Koehler illumination method.
Figure 5B:
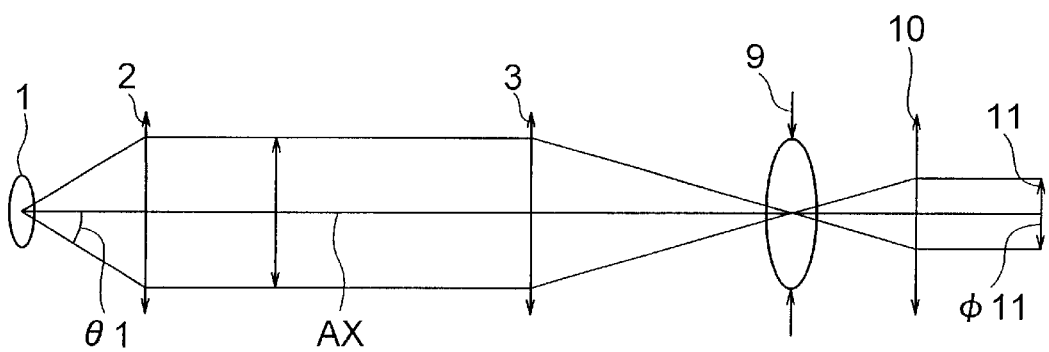

FIG. 3 is a perspective view showing an inverted microscope according to a third embodiment. FIG. 4 is a diagram showing the automated light source image forming zoom lens portion 200. The same elements as those of the above embodiment are given the same reference numbers, and the overlapping description is omitted, and the characteristic part will be described hereinafter in detail.

The inverted microscope of this embodiment is provided with the episcopic illumination device of the above embodiment and electrically driven and automated by means of drive portions 202, 204 and a controller 800 to be described later.

In FIG. 3, a microscope main body 400 is provided with camera ports 700a, 700b and 700c, and is capable of simultaneously mounting three CCD cameras to the maximum. In FIG. 3, a CCD camera 600 is mounted to the camera port 700a. Also, there are various types of CCD sizes such as ⅓ inch, ⅔ inch, ½ inch, etc., which are selectively used by a user in accordance with intended purpose.

The controller 800 has a control portion 810, a display 820, indicators 900a, 900b, 900c and 900d, and an A/M switch 901. The indicators 900a, 900b and 900c correspond to the respective camera ports 700a, 700b and 700c, while the indicator 900d corresponds to an eyepiece port 501 of an eyepiece portion 500a. The controller 800 performs switching of the light path, switching of the magnification of the objective lens, switching of the filter, etc. In the inverted microscope of this embodiment, the light source magnification can be set automatically in accordance with switching of the light path (switching between the eyepiece port and camera ports).

A camera port detecting circuit 701 detects the mounting of a CCD camera upon receiving a signal from a switch (not shown) provided on the camera port 700a, 700b or 700c. In the controller 800, the user can correspond each CCD size of the CCD cameras 600 to the camera ports 700a, 700b and 700c preliminary. When the size of the CCD camera 600 is preliminary corresponded to the camera port and the CCD camera 600 is mounted on the camera port, the camera port detecting circuit 701 can detect to which one of the three camera ports the CCD camera 600 is mounted.

When the CCD camera 600 is mounted on the camera port 700a, 700b or 700c, the indicator 900a, 900b or 900c in the controller 800 is lit up. Also, the indicator 900d is lit up when light is led to the eyepiece port 501. The indicators 900a to 900d serve also as switches for changing the light path to lead light (light image of the specimen) selectively to the respective ports. These indicators 900a to 900d are touch switches. When one of the indicators 900a to 900d is pressed, the optical system in the inverted microscope such as the light path switching mirror 116 and the like is shifted, the light image of the specimen led from the object lens 110 is directed to the camera port corresponding to the pressed indicator. At this time, if the indicator gives instructions for switching the light path to the camera port to which the CCD camera is not mounted, switching of the light path is not carried out.

In FIG. 4, the light source image forming zoom lens portion 200 is provided with a zoom operating ring 200a movable around the optical axis for changing the light source magnification and an indication ring 200b for setting the light source magnification on the outer peripheral surface of the lens barrel thereof.

The zoom operating ring 200a is provided with an index 201 and the indication ring 200b is provided with recommendation indications 203. When the index 201 is pointed to the recommendation indication 203, the optimum light source magnification is set with respect to change of the CCD size of the CCD camera or change of the visual field in eyepiece observation. In this embodiment, as the recommendation indications 203, there are provided recommendation indications representing the optimum light source magnifications to the respective CCD sizes of the CCD cameras, and a recommendation indication (not shown) representing the optimum light source magnification when the light path is switched to the eyepiece portion 500a. When the index 200 is pointed to between the two recommendation indications, it is possible to set the intermediate light source magnification.

Under such structure, when the zoom operating ring 200a for changing the light source magnification is rotated, the zoom lens 115 in the light source image forming zoom lens portion 200 is shifted in the direction of the optical axis thereby to change the light source magnification. Also, the zoom operating ring 200a is driven electrically by the motor 202. By way of switching of the A/M switch mounted on the controller 800, it is possible to select whether the zoom operating ring 200a is driven by the motor 202 automatically or driven manually (adjusted manually).

Cases where the zoom operating ring 200a is driven by the motor 202 automatically and driven manually are hereinafter described separately.

First, the case where the zoom operating ring 200a is driven by the motor 202 automatically will be described. The user carries out switching of the light path in accordance with eyepiece observation at the eyepiece portion 500a, or monitor observation or image pick-up by means of the CCD camera with the desired CCD size. This switching of the light path is performed by way of selecting (pressing) the indicator 900a, 900b, 900c or 900d.

When the CCD camera with the desired CCD size is selected, that is, when the indicator 900a, 900b or 900c is switched, the camera port detecting circuit 701 detects whether the CCD camera is mounted to the selected camera port 700a, 700b or 700c in accordance with a signal from a switch provided on the camera port.

When the camera port detecting circuit 701 detects that the CCD camera 600 is mounted on the selected camera port, the following operation is performed. It is to be noted that when the mounting of the CCD camera 600 is not detected, switching of the light path is not performed.

After the indicator 900a, 900b or 900c is switched, the light path switching mirror 116 is driven by the motor 204. Upon the drive of the light path switching mirror 116, the light path is switched to the selected camera port. Thereafter, the zoom operating ring 200a is driven by the motor 202 such that the index 201 is pointed to the recommendation indication 203 representing the CCD size of the selected CCD camera. As a result, the image of the light source of the light source portion 150 is formed at the light source magnification optimum to the CCD size of the selected CCD camera.

Also, in the case of observing the specimen at the eyepiece portion 500a with naked eyes, when the indicator 900d is selected, the light path switching mirror 116 is driven by the motor 204 to cause the light path to be switched. Then, light from the specimen is led to the eyepiece portion 500a. Accordingly, the zoom operating ring 200a is driven by the motor 202, so that the light source magnification optimum to the eyepiece port is automatically set.

The control portion 810 in the controller 800 entirely controls judgment of the detection result of the camera port detecting circuit in accordance with the selection of the indicators 900a to 900d, drive of the light path switching mirror 116 for switching the light path and drive of the zoom operating ring 200a.

Next, the case where the zoom operating ring 200a is driven manually will be described. The user selects manual setting on the A/M switch 901 of the controller 800. When the manual setting is selected, the user can rotate the zoom operating ring 200a directly manually and set the light source magnification freely. In this case, it is possible to set the position of the index 200 in compliance with the CCD size of the CCD camera mounted on the camera port referring to the recommendation indication 203 on the indication ring 200b.

Thus, the inverted microscope with the episcopic illumination device is capable of changing manually or automatically the light source magnification of the episcopic illumination device in accordance with the CCD size of the CCD camera.

In this embodiment, the CCD camera is mounted on the camera port. The present invention is not limited thereto, and an electronic camera with another image pick-up device can be mounted on the camera port to change manually or automatically the light source magnification of the episcopic illumination device in accordance with the size of an image pick-up surface of the electronic camera.

According to the present invention, it is possible to provide a microscope episcopic illumination device and a microscope therewith which has a simple structure, is provided with an aperture diaphragm and a field stop necessary as a microscope illumination device, and is capable of setting an optimum light source magnification in accordance with change of an image surface size required for from observation by way of eyepiece to observation by the use of a TV camera.

What is claimed is:

1. A microscope episcopic illumination device comprising:
    a light source to supply light;
    a collector lens system to convert said light from said light source into substantially parallel light flux;
    an aperture diaphragm;
    a light source image forming lens system having a variable finite focal distance to condense said substantially parallel light flux from said collector lens system and form an image of said light source in the vicinity of said aperture diaphragm;
    a pupil relay lens system to re-form said image of said light source formed in the vicinity of said aperture diaphragm in the vicinity of a pupil plane of an object lens system; and
    a field stop being provided between said aperture diaphragm and said pupil plane of said objective lens system,
    wherein said light source image forming lens system varies a protection magnification of a ratio of the size of said re-formed image of said light source in the vicinity of said pupil plane of said objective lens system to the size of said light source by changing said focal distance of said light source image forming lens system,
    wherein said light source image forming lens system comprises in order from the side of said light source:
    a first lens group with positive refracting power;
    a second lens group with negative refracting power; and
    a third lens group with a positive refracting power, and
    wherein at least said second lens group is shifted along an optical axis to vary said focal distance of said light source image forming lens system successively.

2. A microscope episcopic illumination device as claimed in claim 1, wherein said light source image forming lens system has a plurality of light source image forming lens units, said focal distance of said light source image forming lens system being varied by selectively loading and unloading each of said light source image forming lens units in a light path.

3. A microscope comprising:
    a microscope episcopic illumination device having
    a light source to supply light;
    a collector lens system to convert said light from said light source into substantially parallel light flux;
    an aperture diaphragm;
    a light source image forming lens system having a variable finite focal distance to condense said substantially parallel light flux from said collector lens system and form an image of said light source in the vicinity of said aperture diaphragm;
    a pupil relay lens system to re-form said image of said light source formed in the vicinity of said aperture diaphragm in the vicinity of a pupil plane of an object lens system; and
    a field stop being provided between said aperture diaphragm and said pupil plane of said objective lens system,
    wherein said light source image forming lens system varies a projection magnification of a ratio of the size of said re-formed image of said light source in the vicinity of said pupil plane of said objective lens system to the size of said light source by changing said focal distance of said light source image forming lens system;
    at least a camera port to mount an electronic camera;
    a light path switching member to switch a light path of light from a specimen in order to direct said light from said specimen either to said camera port or to an eyepiece portion;
    a drive unit to vary said focal distance of said light source image forming lens system; and
    a controller to control said drive unit,
    wherein said controller controls said drive unit to set said projection magnification based on the size of an image pick-up surface of said electronic camera mounted on said camera port.

4. An microscope as claimed in claim 3 wherein said controller controls said light path switching member to direct said light from said specimen to said camera port and controls said drive unit.

5. A microscope as claimed in claim 4, comprising:
    a detector to detect that said electronic camera is mounted on said camera port,
    wherein said controller controls said light path switching member in accordance with the detection result of said detector.

6. A microscope episcopic illumination device comprising:
    a light source to supply light;
    a collector lens system to convert said light from said light source into substantially parallel light flux;
    an aperture diaphragm;
    a light source image forming lens system having a variable finite focal distance to condense said substantially Parallel light flux from said collector lens system and form an image of said light source in the vicinity of said aperture diaphragm;

a pupil relay lens system to re-form said image of said light source formed in the vicinity of said aperture diaphragm in the vicinity of a pupil Diane of an object lens system; and a field stop being provided between said aperture diaphragm and said pupil plane of said objective lens system, wherein said light source image forming lens system varies a protection magnification of a ratio of the size of said re-formed image of said light source in the vicinity of said pupil plane of said objective lens system to the size of said light source by changing said focal distance of said light source image forming lens system, wherein a lens barrel of said light source image forming lens system is constituted of a first lens barrel and a second lens barrel, wherein said first lens barrel has a zoom operating ring rotatable around an optical axis to change said projection magnification, and wherein said second lens barrel has an indication ring to set said projection magnification, said indication ring having the size of said image pick-up surface of said electronic camera indicated.

7. A microscope episcopic illumination device comprising:

a light source to supply light;

a collector lens system to convert said light from said light source into substantially parallel light flux;

an aperture diaphragm;

a light source image forming lens system having a variable finite focal distance to condense said substantially parallel light flux from said collector lens system and form an image of said light source in the vicinity of said aperture diaphragm;

a pupil relay lens system to re-form said image of said light source formed in the vicinity of said aperture diaphragm in the vicinity of a pupil plane of an object lens system; and a field stop being provided between said aperture diaphragm and said pupil plane of said objective lens system, wherein said light source image forming lens system varies a projection magnification of a ratio of the size of said re-formed image of said light source in the vicinity of said pupil plane of said objective lens system to the size of said light source by changing said focal distance of said light source image forming lens system, and wherein said light source image forming lens system has a plurality of light source image forming lens units, said focal distance of said light source image forming lens system being varied by selectively loading and unloading each of said light source image forming lens units in a light path.

* * * * *

UNITED STATES PATENT AND TRADEMARK OFFICE
CERTIFICATE OF CORRECTION

PATENT NO. : 6,657,782 B2
DATED : December 2, 2003
INVENTOR(S) : Yasuo Yonezawa

It is certified that error appears in the above-identified patent and that said Letters Patent is hereby corrected as shown below:

<u>Column 11,</u>
Line 1, change "Parellel" to -- parallel --;
Line 6, change "Diane" to -- plane --.

Signed and Sealed this

Twentieth Day of April, 2004

JON W. DUDAS
*Acting Director of the United States Patent and Trademark Office*